United States Patent
Sting et al.

(10) Patent No.: US 6,168,008 B1
(45) Date of Patent: Jan. 2, 2001

(54) DRIVE SYSTEM FOR A MAIL PROCESSING MACHINE

(75) Inventors: Martin Sting, Frankfurt; Axel Brauneis, Muenzenberg/Gambach, both of (DE)

(73) Assignee: Bell & Howell GmbH, Friedberg (DE)

( * ) Notice: Under 35 U.S.C. 154(b), the term of this patent shall be extended for 0 days.

(21) Appl. No.: 09/348,419

(22) Filed: Jul. 7, 1999

(51) Int. Cl.[7] .................................................. B65G 47/31
(52) U.S. Cl. .................................. 198/461.3; 198/461.2; 198/832.1
(58) Field of Search ........................... 198/459.1, 461.2, 198/461.3, 461.1, 832, 832.1

(56) References Cited

U.S. PATENT DOCUMENTS 3,572,495 * 3/1971 Luginburl .......................... 198/461.2
3,901,375 * 8/1975 Raque ................................. 198/461.3
4,838,408 * 6/1989 Brawn ........................... 198/459.1 X

* cited by examiner

Primary Examiner—James R. Bidwell
(74) Attorney, Agent, or Firm—Jenkins & Wilson, P.A.

(57) ABSTRACT

In a drive system for a mail processing machine a comparatively simple and clear design of the driving tracks and of the bearings for the respective shafts is obtained by feeding drive energy from a common drive motor to a bevel gear drive and a step gear drive. Thereby, the output shafts of the bevel gear drive and the step gear drive have identical sense of rotation because of the sense of rotation reversal within the respective gear drive. The bevel gear drive, at its output, provides a continuous rotation, and the step gear drive provides an intermittent rotation. From the output shafts of the bevel gear drive and of the step gear drive, respectively, driving connections can be led to the driving shafts for a continuously moved conveyor chain for documents and to an intermittently moved conveyor chain for documents, respectively.

5 Claims, 2 Drawing Sheets

DRIVE SYSTEM FOR A MAIL PROCESSING MACHINE

TECHNICAL FIELD

The invention relates generally to drive systems, and more particularly, to a drive system for a mail processing machine.

BACKGROUND ART

Mail processing machines with continuously driven conveyor chains having document feeding sections defined by feeding fingers are known. Handling stations or processing stations are lined up along such conveyor chains. Documents or sets of documents are advanced from the handling stations or processing stations into the document feeding sections by generating a movement of the documents or sets of documents in feeding direction of the continuously driven conveyor chain so that constantly stopping and re-accelerating, respectively, of the conveyor chain is not necessary.

However, as soon as the documents or sets of documents of the feeding sections of the conveyor chain approach a handling section or processing section in which a precise positioning of the document or of the set of documents in relation to the feeding direction is essential for the further handling or processing in this handling station or processing station, it is necessary to switch over from a continuous feeding to an intermittent feeding. This applies particularly as the documents or sets of documents reach an inserter station in which the documents or sets of documents are inserted into envelopes provided in opened status, the inserting taking place in a direction transverse to the feeding direction of the conveyor chain.

For this purpose, in known mail processing machines, the first mentioned continuously driven chain transfers the documents or sets of documents from its feeding section to a further conveyor chain being driven temporarily with increased speed, however, being stopped in predetermined time intervals, the transferring taking place before the documents or sets of documents reach the inserter station. The further or second conveyor chain is operated with its operation speed and its operation cycle tuned to the operation speed of the first mentioned conveyor chain so that, at a transfer location, the feeding fingers of the intermittently driven conveyor chain raise or emerge above the level of the conveyor track in a region behind the respective feeding fingers defining a feeding section of the continuously driven conveyor chain on the rear side. Because of different widths of the respective trace of the continuously driven conveyor chain on the one side and of the intermittently driven conveyor chain on the other side, the feeding fingers of the intermittently driven conveyor chain override the feeding fingers of the continuously driven conveyor chain sidewise, and, thereby take over the set of documents being advanced. This having happened, the feeding fingers of said continuously driven conveyor chain moving slower and having become disengaged from the document or the set of documents dive or drop below the level of the conveyor track. The feeding fingers of the intermittently driven conveyor chain push the document or the set of documents in a desired position of the handling station or inserter station and, as soon as the desired position has been reached, are stopped by switching off the drive of the intermittently driven conveyor chain for a short time interval.

The respective handling station having completed its operation cycle and the document or set of documents having been further advanced or having been inserted in a direction transverse to the feeding direction horizontally, the intermittently driven conveyor chain is reactivated and the operation cycle described above can now repeat.

For tuning the operation speeds of the respective conveyor chains, and for synchronizing the operation cycles, mechanical gears, means for speed control and closed-loop speed control, and furthermore clutches controllable by electrical signals and the like can be utilized. In some cases, the required control and regulation means are sensitive to defects and malfunction and may not reliably avoid the diverse parts of the driving system to lose synchronism.

Providing a guided tuning, i.e., a mechanically geared synchronism, results in high expenditure for bearings, parts of gears, diverting an reversing means and further parts of the transmission.

From German Patent 3815216, a drive system having two cascaded conveyor chains for hollow bodies and a handling station is known. The conveyor chains and the handling station are driven by a common driving motor, whereby the output shaft of the driving motor, which is parallel to the driving shafts of said two conveyor chains, is coupled between said driving shafts of the conveyor chains via three horizontally oriented bevel gears of a bevel gear drive, the respective axes of said bevel gears consecutively defining 90° angles.

SUMMARY OF THE INVENTION

The drive system of the present invention is adapted for use with a suitable mail processing system, such as a mail processing system comprising:

a first conveyor chain being continuously moved and having first document feeding sections by first feeding fingers;

a second conveyor chain following the first conveyor chain in feeding direction, being moved intermittently and having second document feeding sections defined by second feeding fingers; and the second conveyor chain taking over sets of documents of the first conveyor chain and, in operation, advancing the sets of documents to a handling station with increased speed.

It is therefore an object of the present invention to provide a novel drive system for a mail processing machine so that a geared drive and asynchronism of the parts operated in mutually tuned manner of the mail processing machine is obtained at comparatively reduced expenditure and with a comparatively simple and clear structure.

This object, in accordance with the present invention, is achieved by a drive system having the features defined above and wherein a common drive motor serves for driving horizontal, parallel driving shafts of the first and second conveyor chains, respectively, the common driving motor having an output shaft which is parallelly oriented to the first and second driving shafts and which is coupled to the first driving shaft of the continuously moved first conveyor chain via three horizontally oriented bevel gears of a bevel gear drive, the respective axes of the bevel gears consecutively defining 90° angles and wherein the output shaft is furthermore coupled to the second driving shaft of the intermittently moved conveyor chain via a step gear drive, the input shaft and the output shaft of the step gear drive having respectively opposite sense of rotation and being oriented parallelly to the first and second driving shaft.

Advantageously, the bevel gear drive is mounted on the frame structure of the mail processing machine adjacent the step gear drive, wherein the input shaft and the output shaft of the bevel gear drive are coaxial and, as are the input shaft and the output shaft of the step gear drive, are positioned below the conveyor track of the conveyor chains oriented transverse to the feeding direction.

It is with this design that an indexed belt drive or a chain drive can be led from the output shaft of the bevel gear drive directly upward to the driving shaft of the continuously driven conveyor chain, and a further indexed belt drive or chain drive can be led from the output shaft of the step gear drive directly upward to the driving shaft of the intermittently driven conveyor chain. The input shaft of the bevel gear drive and the input shaft of the step gear drive can be coupled directly, e.g., by an indexed belt drive or a chain drive, and rotate in the same direction. The output shafts of the bevel gear drive and of the step gear drive also rotate in one and the same direct, however, respectively opposite to the sense of rotation of the corresponding input shafts, since, in the step gear drive, a reversal of the sense of rotation takes place. Also a reversal of the sense of rotation takes place by the three bevel gears of the bevel gear drive.

The shaft of the middle or second bevel gear of the bevel gear drive is, extended horizontally to the outside of the gear housing and, by an indexed belt drive or a chain drive led in direction upward, allows feeding drive energy to a further driving shaft which is supported horizontally in the frame structure of the mail processing machine parallelly to the conveyor track of the conveyor chains, the further driving shaft serving for operation of processing stations and handling stations lined up along the conveyor track, and particularly, also for operating the handling station, into which the intermittently driven conveyor chain advances documents and sets of documents.

Some of the objects of the invention having been stated hereinabove, other objects will become evident as the description proceeds, when taken in connection with the accompanying drawings as best described hereinbelow.

BRIEF DESCRIPTION OF THE DRAWINGS

An advantageous embodiment of the novel drive system in accordance with the present invention is described below in connection with the drawings of which.

DETAILED DESCRIPTION OF THE INVENTION

Figure 1:
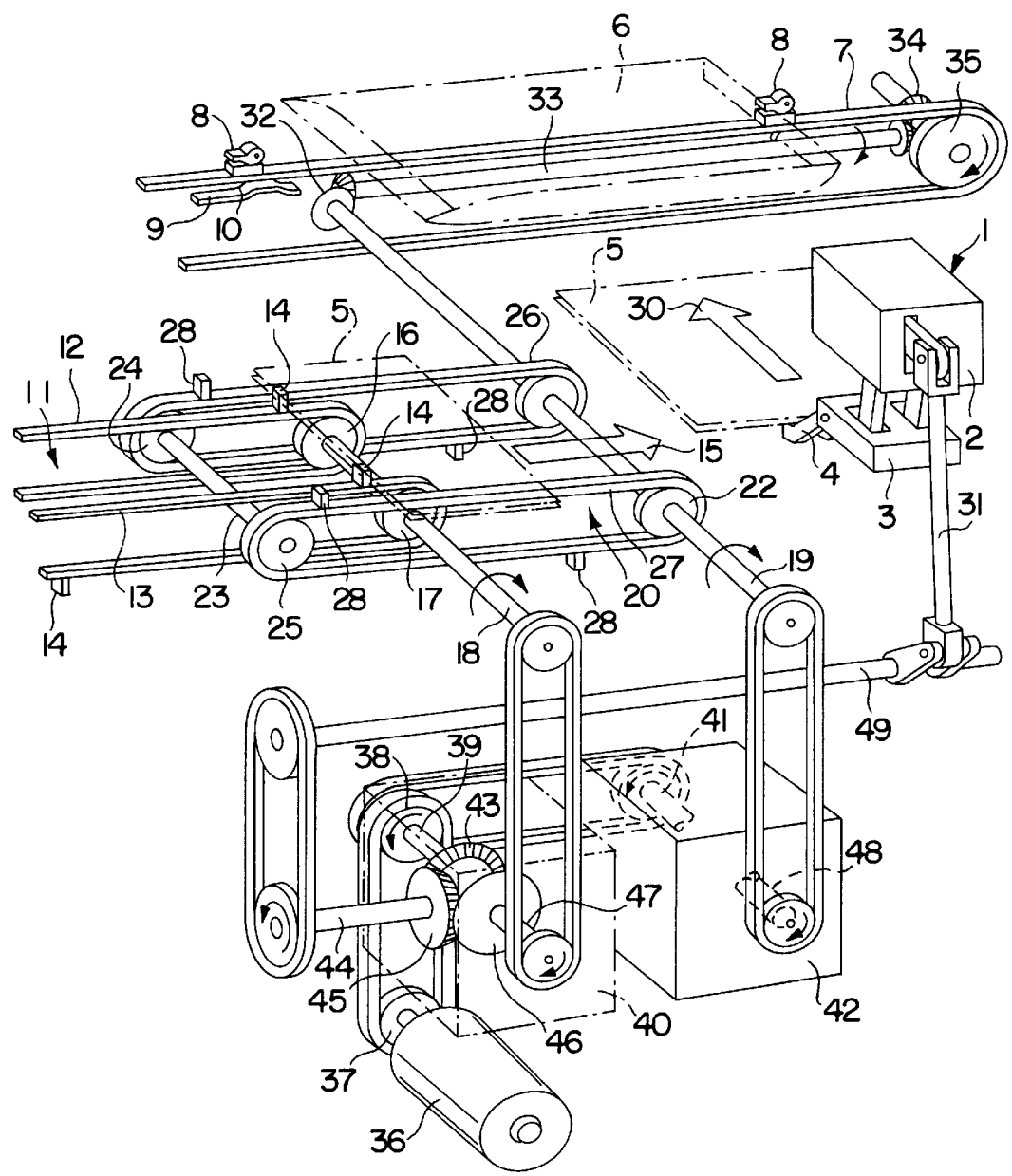
FIG. 1 is an isometric sketch of a drive system in accordance with the present invention of a mail processing machine with conveyor chains and an inserter station, the sketch being highly schematic.

In FIG. 1, a handling station is indicated at 1. The handling station in the embodiment shown, comprising a swivel lever mechanism 2 for swivelling a manipulator hand 3 over and across a horizontal base plate which is not shown in FIG. 1. Resiliently pivotable manipulator fingers 4 are provided on the manipulator hand 3. The manipulator fingers serve for inserting documents or sets of documents 5 into envelopes 6 being provided in opened position.

The handling station 1, furthermore, comprises an intermittently driven, endless, rotating gripper chain 7 having gripper claws 8 mounted thereto. Below the upper reach of the gripper chain 7 there are guide elements or cam elements 9 mounted to the frame structure and cooperating with cam follower fingers 10 of the respective gripper claws 8 and, during rotation of the gripper chain 7 and, thereby, during the cam follower finger 10 passing the fixedly mounted cams or ramps 9, effect opening of the gripper claws 8 against spring bias. The gripper claws 8 serve for gripping the leading edge of a respective envelope which is pulled by the respective gripper claw 8 within a guiding channel provided in the region of the gripper chain 7, into a position, in which inserting of the document or the set of documents 5 takes place. In a corresponding position the gripper claw 8 is reopened after the envelope has been filled so that the filled envelope is delivered. This mode of operation of an inserter station with a part of the device for inserting the documents and with a further part of the device for feeding the envelopes and for opening the envelopes is known to one of ordinary skill in the art.

Feeding of the documents or sets of document 5 to the inserter station 1 takes place in the first instance by a continuously moved first conveyor chain 11 comprising two endless rotating chains or conveyor belts 12 and 13 onto which there are mounted first feeding fingers 14. The chain tracks or conveyor belts 12 and 13 have a predetermined horizontal distance from each other, so that a document or a set of documents 5 can be fed under stable conditions by the feeding fingers 14 engaging the trailing edge of the document or set of documents in direction of the arrow 15. The chain tracks or conveyor belts 12 and 13 are led around sprockets or pulleys 16 and 17, respectively, which are fastened in predetermined axial distance on a driving shaft 18 for the first, continuously driven conveyor chain 11. The chain tracks or conveyor belts 12 and 13 in some distance opposite to the feeding direction, are led over further idling sprockets or pulleys, which correspond to the sprockets or pulleys 16 and 17, which, however, are not shown in FIG. 1.

Fixed on a driving shaft 19 for a further intermittently moved conveyor chain 20, there are two sprockets or pulleys 21 and 22 in a mutual axial distance, which is greater than the axial distance of the sprockets or belt pulleys 16 and 17. On an axis 23 in some horizontal distance opposite to the feeding direction corresponding to arrow 15, there are fixed sprockets or belt pulleys 24 and 25 with an axial distance identical to the axial distance between sprockets or belt pulleys 21 and 22. Because of the greater axial distance between the sprockets or belt pulleys 21 and 22 as well as between the sprockets or belt pulleys 24 and 25, chains or conveyor belts 26 and 27 can be laid over pairs of said sprockets or belt pulleys sidewise passing the chains or conveyor belts 12 and 13. The chains or conveyor belts 26 and 27, in a manner corresponding to the chains or conveyor belts 12 and 13, are provided with further feeding fingers 28 comparable to the feeding fingers 14.

When the driving shaft 18 is rotated continuously with predetermined speed, documents or sets of documents 5 can be advanced continuously on the conveyor track, in the plane of which the upper reaches of the chains or conveyor belts 12 and 13 are running, by engagement of the feeding fingers 14 at the trailing edges of the documents or sets of documents 5 in direction of arrow 15, whereby, in the horizontal plane region above the conveyor track there are defined feeding sections by feeding fingers 14 being positioned side by side in transverse direction (in the present embodiment it is pairs of feeding fingers which define feeding sections). Into these document feeding sections the documents or sets of documents 5 can be fed or inserted by a movement in direction parallel to the feeding direction and, as the case may be, from above, during the continuous movement of the conveyor chain 11. This feeding onto the conveyor chain can be described as an in-line-insertion. Such feeding stations or advancing means are not shown in FIG. 1. They would be positioned, in relation to the position of the system parts of FIG. 1, in a section of the conveyor chain 11 to the left.

The documents or sets of documents 5 having been moved by the feeding fingers 14 in feeding direction in accordance with arrow 15 beyond the position of the sprockets or belt pulleys 24 and 25, as shown in FIG. 1, the driving shaft 19 of the intermittently moved conveyor 20 is put into rotation and the feeding fingers 28 move around the sprockets or belt pulleys 24 and 25 clockwise and raise above the level of the conveyor track of the conveyor chains behind the trailing edge of a document or a set of documents 5. Because of the greater feeding speed of the conveyor chain 20 during it phase of energization, the feeding fingers 28 of the conveyor chain 20 override the feeding fingers 14 of the conveyor chain 11, engage the trailing edge of the document or set of documents 5 and push the document or set of documents 5 during the energization phase of the conveyor chain 20 rapidly into the region of the handling station or inserter station 1. There, the movement of the manipulator hand 3 is adapted to the operation speed and the operation cycle of the conveyor chain 20 in such manner that, immediately after arrival of a document or set of documents 5, the manipulator hand 3 is advanced in direction of the arrow 30 for inserting the document or the set of documents 5 into the waiting opened envelope 6.

The actuation of the handling station 1 tuned to the operation of the conveyor chain 20 is effected by a connecting rod 31 and a crank shaft 49 as schematically shown in FIG. 1.

Finally, it can be seen from FIG. 1 that the driving shaft 19 for the intermittently moved conveyor chain 20 is extended beyond the sprockets or belt pulleys 21 and 22 and leads to a bevel gear drive 32 which transmits the rotation movement of the driving shaft 19 onto a shaft 33 oriented parallelly to the feeding direction corresponding to arrow 15. In predetermined distance from the bevel gear drive 32 there is provided, at the end of shaft 33, a further bevel gear drive 34 which serves for transmitting the intermittent rotation of the driving shaft 19 of the intermittently moved conveyor chain 20 onto a driving sprocket 35 for the gripper chain 7. One of ordinary skill in the art will see from the arrangement of FIG. 1 that the directions of rotation of the driving shaft 19 on the one hand and of the driving shaft for the sprocket 35 on the other hand correspond to each other.

It can be stated that the parts of a mail processing machine shown in FIG. 1, i.e., the continuously moved conveyor chain 11, the intermittently moved conveyor chain 20, the handling station I operated in cycles and having a swivelling manipulator hand 3 as well as intermittently operated gripper chain 7 with its cam controlled gripper claws 8 are combined to a drive system which is driven by a common drive motor 36. The drive motor 36 carries a sprocket or a belt pulley 37 and is coupled via a chain drive or via an indexed belt drive, to a sprocket or a drive pulley 38 which is fastened onto the input shaft 39 of a bevel gear drive 40. Moreover, a sprocket or a belt pulley is fastened to the input shaft 39 for coupling the input shaft 39 of the bevel gear drive to an input shaft 41 of a step gear drive 42 via a chain or an indexed belt as can be seen from FIG. 1. Details of the step gear drive 42 are discussed below in connection with FIG. 2.

The bevel gear drive 40 comprises a first bevel gear 43 fixed to the input shaft 39, a second bevel gear 45, fixed to a shaft 44 and being offset with its axis from the first bevel gear by an angle of 90°, and finally, a third bevel gear 46 having its axis offset in relation to the access of the bevel gear 45 again by 90°. The third bevel gear 46 is fixed to an output shaft 47 of the bevel gear drive. The sense of rotation of the shafts 39 and 47 is respectively opposite as can be easily seen from FIG. 1.

The step gear drive 42 is of a kind in which the respective sense of rotation of the input shaft 41 and the output shaft 48 of the step gear drive are also respectively opposite. Since the bevel gear drive 40 as well as the step gear drive 42 reverse the sense of rotation from the input shaft to the output shaft, the output shafts 47 and 48 of the bevel gear drive 40 and the step gear drive 42, respectively, having resultant even sense of rotation, can be used for driving the driving shaft 18 of the continuously moved conveyor chain 11 and for driving the driving shaft 19 for the intermittently moved conveyor chain 20, respectively.

Moreover, the driving energy for the crank shaft 49, which is supported parallelly to the feeding direction of the conveyor chains 11 and 20 in the extended frame structure of the mail processing machine, can be deduced direction from the shaft 44 having the bevel gear 45 of the bevel gear drive 40 fastened thereto. Finally, the driving energy for the gripper chain 7 which has to be operated intermittently, can be deduced from the drive for the intermittently moved conveyor chain 20, which can be effected via the extension of the driving shaft 19 reaching the bevel gear 32, furthermore by this bevel gear, by shaft 33 and by the further bevel gear drive 34 for rotating the sprocket 35.

The driving connections between the shafts 47 and 18, between the shafts 48 and 19 and between the shafts 44 and 49 can be realized by chain drives or indexed belt drives as is indicated in FIG. 1.

Figure 2:
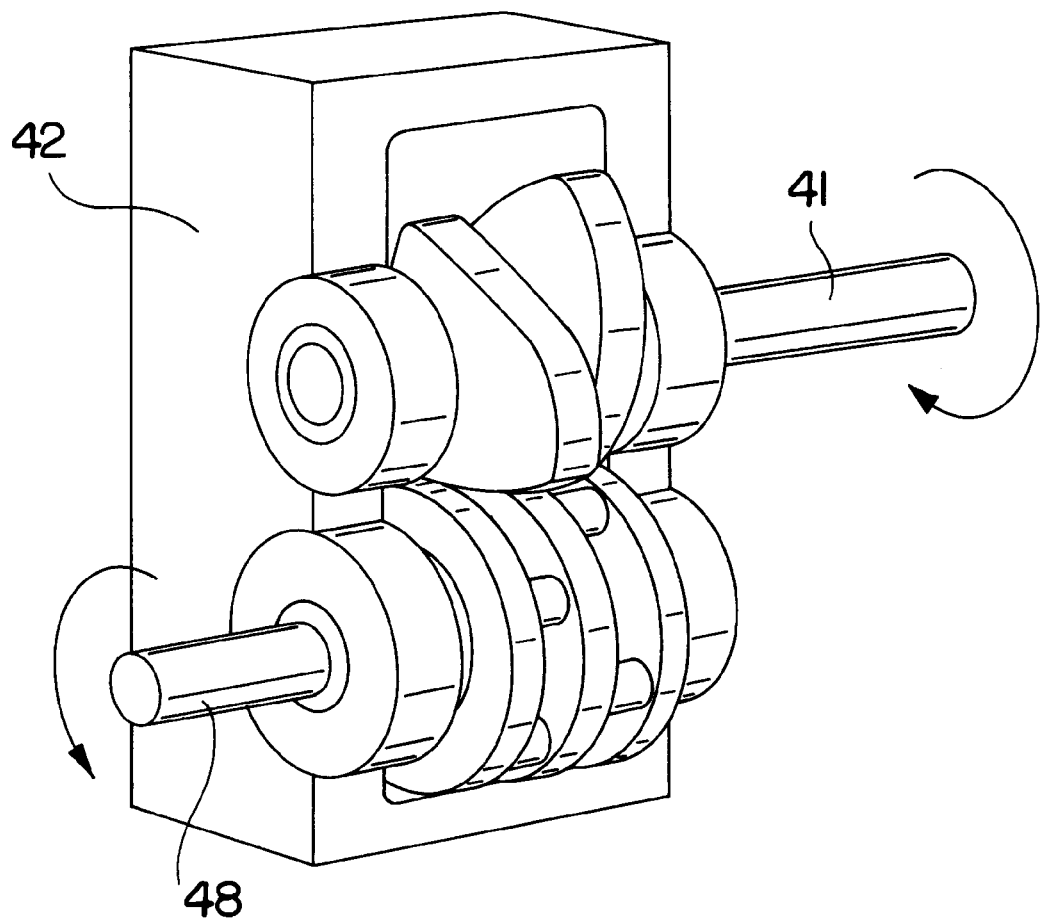
FIG. 2 is a schematic isometric view of a step gear drive of a kind known per se, the housing of the gear drive being shown opened.

FIG. 2 shows one example or embodiment of the step gear drive 42. Fastened to the input shaft 41 of the step gear drive 42 is an arrangement of cams offset in circumferential direction. The apexes of the cams engage between rods of a rod cage arrangement which is fastened to the output shaft 48 of the step gear drive. The apexes of the cams of the input shaft 41 mate between the rods of the rod cage arrangement in the manner of a gear connection and, corresponding to the rotation of the input shaft 41, effect a rotation of the rod cage arrangement and, thereby, of the output shaft 48. As soon as the cam apexes come out of engagement with the rods, the rear sides of the cams of the cam arrangement engage the rods and, thereby, block a further rotation of the shaft 48. The structure and mode of operation of such step gear drives are known to one of ordinary skill in the art. It can be stated that the respective sense of rotation of the shafts 41 and 48 is respectively opposite.

It can be seen that, by means of the electrical drive motor 36, the output shaft of which has an axis being oriented parallelly to the output shafts 18 and 19 and parallelly to the shafts 39, 41, 47 and 48, substantially four differently operated and actuated parts of mail processing machines can be driven in synchronism and in matched cycles by gear drive units positioned adjacent to each other, i.e., the bevel gear drive 40 and the step gear drive 42.

It will be understood that various details of the invention can be changed without departing from the scope of the invention. Furthermore, the foregoing description is for the purpose of illustration only, and not for the purpose of limitation, as the present invention is defined by the following, appended claims.

What is claimed is:

1. A drive system for a mail processing machine, said mail processing machine comprising:
   (a) a first conveyor chain being continuously moved and having first document feeding sections defined by first feeding fingers;
   (b) a second conveyor chain following that first conveyor chain in feeding direction, being moved intermittently and having second document feeding sections defined by second feeding fingers; and
   (c) said second conveyor chain taking over sets of documents from said first conveyor chain and, in operation, advances said sets of documents to a handling station with increased speed;

and said drive system comprising a common driving motor serving for driving horizontal, parallel driving shafts of said first and second conveyor chains, respectively, said common driving motor having an output shaft which is parallelly oriented to said first and second driving shafts and which is coupled to said first driving shaft of said continuously moved first conveyor chain via three horizontally oriented bevel gears of a bevel gear drive, the respective axes of said bevel gears consecutively defining 90° angles, and wherein said output shaft is furthermore coupled to said second driving shaft of said intermittently moved conveyor chain via a step gear drive, the input shaft and the output shaft of said step gear drive having respectively opposite sense of rotation and being oriented parallelly to said first and second driving shafts.

2. The drive system in accordance with claim 1 wherein the shaft of the second bevel gear of the bevel gear drive is coupled to a drive shaft for the handling station, said drive shaft being oriented parallelly to said conveyor chains.

3. The drive system in accordance with claim 1 wherein the drive shaft of the intermittently moved conveyor chain is coupled with a gripper chain which is also intermittently moved and is arranged parallelly to and in predetermined distance from said first and second conveyor chains for transporting envelopes into said handling station, which comprises an inserter station.

4. The drive system in accordance with claim 3 wherein an intermediate shaft is provided, said intermediate shaft being driven by said driving shaft of said intermittently moved conveyor chain via a pair of bevel gears, said intermediate shaft being oriented parallelly to said gripper chain and driving a sprocket of said gripper chain via a further pair of bevel gears.

5. The driving system in accordance with claim 4 wherein chain drives or indexed belt drives are provided between the driving motor and said bevel gear drive, furthermore, between said bevel gear drive and said step gear drive, moreover between said bevel gear drive and said driving shaft for the continuously moved conveyor chain and finally between said step gear drive and said drive shaft of said intermittently moved conveyor chain.

* * * * *